United States Patent Office 3,547,882
Patented Dec. 15, 1970

3,547,882
LIGHT-STABLE POLYESTERS
William Michael Corbett, John Francis Lloyd Roberts, and John Michael Yates, Harrogate, England, assignors to Imperial Chemical Industries Limited, London, England, a corporation of Great Britain
No Drawing. Filed June 9, 1967, Ser. No. 644,805
Claims priority, application Great Britain, June 16, 1966, 26,863/66
Int. Cl. C08g 17/08, 51/04, 51/56
U.S. Cl. 260—47                                5 Claims

ABSTRACT OF THE DISCLOSURE

High molecular weight polyesters containing $x$ percent of anatase titanium dioxide and $y$ percent of cobalt ions, $x$ being 1.5 to 3.0 and $x/y$ being from 50 to 150.

---

The present invention relates to polyesters of high stability towards the degradative effect resulting from exposure to light rays.

According to the present invention we provide a high molecular weight polyester containing $x$ percent by weight of titanium dioxide in the anatase form and $y$ percent of cobalt ions by weight, each percentage being based on the weight of polyester, $x$ being from 1.5 to 3.0 and $y$ being such that $x/y$ is from 50 to 150.

In the term polyester we include homopolyesters which may be prepared by the reaction of a dicarboxylic acid with a glycol, although either or both of the reactants may be in the form of a suitable derivative, copolyesters in which a minor proportion of the homopolyester repeating units is replaced by a second ester unit, which may or may not have a dicarboxylic acid or glycol units in common with the main repeating unit and polyester ethers wherein for each ester group there is up to one ether group on average.

In order that they may yield valuable fibres, the polyesters for use in the process of our invention should be such that at least 85 percent of their polyester units are poly(ethylene terephthalate) or are poly(ethylene-1:2-diphenoxyethane - 4:4' - dicarboxylate) units. Examples of suitable second carboxylic acids for preparation of copolyester are isophthalic and adipic acids. Examples of suitable glycols are those of the formula $HO(CH_2)_nOH$ where $n$ is not less than 2 and not greater than 10, and bis(hydroxymethyl) cyclohexane.

An advantage of the process of our invention is that by means of it polyesters may be prepared which are delustred with anatase titanium dioxide and which have a high stability towards the degradative effect of exposure to light rays, particularly to ultra-violet rays. This is of particular advantage when there is required a polyester containing a high percentage of titanium dioxide in the anatase form as delustrant, since the presence of titanium dioxide in the anatase form in polyesters normally has an adverse effect on the light stability. A highly delustred polyester will normally contain at least 1.5% of titanium dioxide, above about 3.0% of titanium dioxide no enhanced delustring effect is observed. In particular cases, the stability of the highly delustred polyester to light rays may be higher than that of the polyester containing no titanium dioxide. Particularly advantageous results have been obtained when the ratio $x/y$ is from 50 to 120.

The metal may be introduced into the polyester by any suitable means. For example, in the case where the metal is an ester-interchange catalyst and the polyester is prepared by an ester-interchange process, the metal may be introduced at the beginning of the ester-interchange process and may serve as the ester-interchange catalyst with great convenience. However, where an ester-interchange catalyst is required, it is not essential that the metals of our invention should be used exclusively, or at all, as the ester-interchange catalyst; another metal may be used as ester-interchange catalyst and the metal of our invention introduced after the completion of the ester-interchange stage. The metal will normally be added in a soluble form; in cases where an insoluble or sparingly soluble form of the metal is added, the addition is preferably made early in the process of preparation of the polyester, for example at the ester-interchange stage or at the stage of reaction of dicarboxylic acid with glycol in order that the metal should have the maximum opportunity of becoming solubilized before preparation of the polyester is complete.

The titanium dioxide may be added at any suitable stage during the preparation of the polyester. Most convenient is the addition of the titanium dioxide at the end of the ester-interchange reaction in the form of a slurry in the appropriate glycol. The titanium dioxide may be in any suitable state of subdivision; that normally offered for sale as a pigment has given satisfactory results.

Other conventional additive may also be present in the polyester, for example a phosphorus compound in order to minimize thermal degradation.

Particularly high stability is obtained in the case of poly(ethylene bis(carboxyphenoxy)ethane according to the process of our invention.

In order that the process of our invention may be the more fully understood, we give hereinafter Examples 5, 6, 7, 12, 13, 14, 16, 18 and 19. Examples 1, 2, 3, 4, 8, 9, 10, 11, 15, 17 and 20 are given by way of comparison.

EXAMPLES 1–7

These examples illustrate the effect of concentration of anatase titanium dioxide as well as the nature and concentration of the stabilizing metal on the light stability of poly(ethylene terephthalate) fibres.

Poly(ethylene terephthalate) was prepared by ester-interchange of dimethyl terephthalate with excess of ethylene glycol in the presence of an ester interchange catalyst, followed by removal of the excess of glycol and polymerisation under vacuum of the resulting product in the presence of antimony trioxide as catalyst and phosphorous acid as thermal stabilizer, using conditions normally used in commercial practice. To various batches were added various amounts of ester-interchange catalyst and after the ester-interchange stage various amounts of very finely divided titanium dioxide of the anatase form were also added. The quantities of the catalysts are set out in Table 1. The polymers were melt spun and drawn under standard conditions to give 100 denier yarn comprising 48 filaments having a tenacity of 6.5 to 7 grams per denier. The yarns were wound on metal frames and exposed to direct sunlight in Florida, U.S.A., facing South at an elevation of 45°. Samples of the yarns were removed after 1 and 3 months exposure in order to measure their breaking loads. The breaking loads of the exposed fibres, expressed as a percentage of that of the unexposed fibres, are given in Table 1.

It will be clearly seen from Table 1 that the use of a salt outside the scope of this invention (e.g. calcium acetate) has no stabilizing effect upon yarns delustred with anatase titanium dioxide and, further, that such yarns are commercially unacceptable because of their poor stability. However, the use of a salt within the scope of the invention (cobalt acetate) increases considerably the light stability of delustred yarns, particularly if the concentration of metal ions is within the preferred range. More particularly the use of the optimum cobalt acetate concentration produces a heavily delustred yarn more stable than the undelustred yarn.

TABLE 1

| Ester interchange (E.I.) catalyst | E.I. catalyst concentration, percent* | Titanium dioxide, TiO₂ percent | Ratio TiO₂/ metal ion | Percent initial breaking load retained after exposure to sunlight | |
|---|---|---|---|---|---|
| | | | | After 1 month's exposure | After 3 month's exposure |
| Example: | | | | | |
| 1 ........ Calcium acetate ..... | 0.07 | 0 | 0 | 69 | 48 |
| 2 ............ do ............... | 0.07 | 0.5 | 29.5 | 51 | 19 |
| 3 ............ do ............... | 0.07 | 2.0 | 118.0 | 34 | 0 |
| 4 ........ Cobaltous acetate ... | 0.035 | 2.0 | 171.5 | 43 | 10 |
| 5 ............ do ............... | 0.050 | 2.0 | 120.0 | 66 | 34 |
| 6 ............ do ............... | 0.080 | 2.0 | 75.0 | 80 | 63 |
| 7 ............ do ............... | 0.120 | 2.0 | 50.0 | 70 | 50 |

*Percentage by weight as anhydrous ester-interchange (E.I.) catalyst on dimethyl terephthalate, although the catalysts were added as their hydrates.

EXAMPLES 8–14

These examples demonstrate that the beneficial stabilization of delustred fibres to direct sunlight, described in Example 1, is also observed if the exposure is repeated "under glass" and when salts within the scope of this invention are used.

Further samples of the yarn described in Example 1 were wound onto metal formers and exposed at an elevation of 45° to sunlight filtered by passage through ⅛ inch thick standard window glass. This is termed an "under glass" exposure and is desinged to simulate conditions under which curtain nets are normally exposed.

Samples were removed after 3 and 5 months in order to measure their breaking loads. These, expressed as a percentage of the unexposed fibres, are listed in Table 2.

It is again clearly seen that the use of a salt outside the scope of this invention produces delustred yarns of a completely unacceptable stability to sunlight for practical purposes.

ing 2% by weight of titanium dioxide of extremely high light stability.

Fibres containing 2% unstabilized titanium dioxide of the anatase form were spun and drawn under similar conditions from poly(ethylene terephthalate) and poly(ethylene - 1:2 - diphenoxyethane - 4:4' - dicarboxylate) prepared using calcium acetate or cobalt acetate as ester-interchange catalyst. The fibres were exposed in a "WeatherOmeter" fitted with a Xenon lamp and "Pyrex" filter to simulate sunlight, and the percentage of the initial breaking load retained measured periodically (Table 3). It will be seen from the table that both forms of fibre from poly(ethylene - 1:2 - diphenoxyethane - 4:4' - dicarboxylate) are more stable than the more stable form of poly(ethylene terephthalate) and, more particularly, the delustred fibres prepared from poly(ethylene - 1:2 - diphenoxyethane - 4:4' - dicarboxylate) according to our invention have an extremely high stability to artificial sunlight.

TABLE 3

| Polyester | Ester-interchange catalyst concentration, percent* | TiO₂/ metal ion | Percent initial breaking load retained | | | | |
|---|---|---|---|---|---|---|---|
| | | | 67 hrs. | 230 hrs. | 396 hrs. | 560 hrs. | 726 hrs. |
| Example: | | | | | | | |
| 15 .......... Poly(ethylene terephthalate) .... | 0.07 calcium acetate ½H₂O .... | 118 | 78.2 | 52.1 | 37.8 | 32.2 | 27.1 |
| 16 .................... do ...................... | 0.08 cobaltous acetate 4H₂O ... | 75 | 79.2 | 73.3 | 66.3 | 52.8 | 57.2 |
| 17 .......... Poly(ethylene-1:2-diphenoxy-ethane-4:4'-dicarboxylate). | 0.07 calcium acetate ½H₂O .... | 118 | 93.0 | 89.0 | 77.7 | 76.4 | 76.6 |
| 18 .................... do ...................... | 0.08 cobaltous acetate 4H₂O ... | 75 | 94.5 | 91.0 | 92.8 | 89.6 | 90.0 |

*Percentage by weight as anhydrous E.I. catalyst on dimethyl ester.

The use of salts within the scope of the invention, (cobalt acetate), considerably increased the light stability of delustred yarns. In some cases a heavily delustred yarn is obtained which is more stable than the undelustred yarn.

TABLE 2

| Ester interchange (E.I.) catalyst | E.I. catalyst concentration, percent* | Titanium dioxide, TiO₂ percent | Ratio TiO₂/ metal ion | Percent initial breaking load retained after exposure to sunlight under glass | |
|---|---|---|---|---|---|
| | | | | After 3 month's exposure | After 5 month's exposure |
| Example: | | | | | |
| 8 ........ Calcium acetate ..... | 0.07 | 0 | 0 | 73 | 63 |
| 9 ............ do ............... | 0.07 | 0.5 | 29.5 | 36 | 0 |
| 10 ........... do ............... | 0.07 | 2.0 | 118.0 | 17 | 0 |
| 11 ....... Cobaltous acetate ... | 0.035 | 2.0 | 171.5 | 51 | 35 |
| 12 ........... do ............... | 0.05 | 2.0 | 120.0 | 73 | 65 |
| 13 ........... do ............... | 0.08 | 2.0 | 75.0 | 85 | 74 |
| 14 ........... do ............... | 0.12 | 2.0 | 50.0 | 84 | 69 |

*Percentage by weight as anhydrous E.I. catalyst on dimethyl terephthalate, although the catalysts were added as their hydrates.

EXAMPLES 15–18

These examples illustrate the use of a preferred salt at the preferred concentration to give fibres from poly(ethylene 1:2-diphenoxyethane - 4:4' - dicarboxylate) contain-

EXAMPLES 19, 20

This example illustrates the fact that the cobalt ions may be added to the polyester after the completion of ester-interchange.

Fibres were prepared from poly(ethylene 1:2-diphenoxyethane-4:4'-dicarboxylate) containing 2% by weight of unstabilised titanium dioxide of the anatase form as described in Examples 17 and 18. The polyester was, however, prepared using 0.07% by weight of calcium acetate as ester-interchange catalyst and 0.06% by weight of cobalt phosphate was added after ester-interchange. The fibres were exposed in a "WeatherOmeter" to simulate exposure to direct sunlight, and the percentage of the initial breaking load measured periodically (Table 4).

It will be seen from the table that the polyester to which has been added the cobalt phosphate after E.I. was more stable to ultra violet rays than the polyester which did not contain cobalt.

TABLE 4

| Example | Ester-interchange catalyst concentration, percent* | $TiO_2$/ cobalt ion | Percent initial breaking load retained | |
|---|---|---|---|---|
| | | | 385 hrs. | 572 hrs. |
| 19 | 0.07% calcium acetate ½$H_2O$ | [1] 75 | 96.8 | 85 |
| 20 | do | 0 | 95 | 70 |

[1] Cobalt phosphate added after E.I.
* Percentage by weight as anhydrous E.I. catalyst on dimethyl ester.

What we claim is:

1. A high molecular weight fiber-forming polyester of a dicarboxylic acid and a glycol wherein at least 85% of the polyester units are poly(ethylene terephthalate) or poly(ethylene-1:2-diphenoxy ethane-4:4' - dicarboxylate) units, said polyester containing $x$ percent by weight of titanium dioxide in anatase form and cobalt acetate or cobalt phosphate in concentrations sufficient to provide $y$ percent of cobalt ions by weight, each percentage being based on the weight of polyester, $x$ being from 1.5 to 3.0 and $y$ being such that the ratio $x/y$ is from 50 to 150.

2. A high molecular weight polyester according to claim 1 wherein $x$ is 2.

3. A high molecular weight polyester according to claim 1 wherein the ratio $x/y$ is 50 to 120.

4. A high molecular weight polyester according to claim 1 wherein at least 85% of the polyester units are poly(ethylene terephthalate) units.

5. A high molecular weight polyester according to claim 1 wherein at least 85% of the polyester units are poly(ethylene-1:2-diphenoxy ethane-4.4' - dicarboxylate) units.

References Cited

UNITED STATES PATENTS

| | | | |
|---|---|---|---|
| 2,641,592 | 6/1953 | Hofrichter | 260—75 |
| 2,984,647 | 5/1961 | White et al. | 260—45.75 |
| 3,161,710 | 12/1964 | Turner | 260—75 |
| 3,297,650 | 1/1967 | Halmi | 260—75 |
| 3,398,124 | 8/1968 | Rein et al. | 260—75 |

FOREIGN PATENTS

| | | |
|---|---|---|
| 579,462 | 8/1946 | Great Britain. |
| 610,137 | 10/1948 | Great Britain. |

OTHER REFERENCES

Matiello, Protective and Decorative Coatings, title page and p. 34, vol. II, published 1942, New York, N.Y., John Wiley & Sons.

WILLIAM H. SHORT, Primary Examiner

L. P. QUAST, Assistant Examiner

U.S. Cl. X.R.

260—40, 45.75, 75